(12) United States Patent
Howard et al.

(10) Patent No.: US 7,465,054 B2
(45) Date of Patent: Dec. 16, 2008

(54) FOCUSING ARRANGEMENT

(75) Inventors: P Guy Howard, Junction City, OR (US); Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 886 days.

(21) Appl. No.: 10/976,414

(22) Filed: Oct. 29, 2004

(65) Prior Publication Data
US 2006/0092337 A1 May 4, 2006

(51) Int. Cl.
G03B 21/14 (2006.01)
(52) U.S. Cl. .................... 353/122; 353/121; 353/101
(58) Field of Classification Search .............. 349/57, 349/58, 62, 61; 353/100–102, 85–87, 121, 353/122; 348/771, 745–747, 744
See application file for complete search history.

(56) References Cited

U.S. PATENT DOCUMENTS

| | | | | |
|---|---|---|---|---|
| 5,860,721 A | * | 1/1999 | Bowron et al. | 353/101 |
| 6,013,911 A | | 1/2000 | Hibbard | 353/87 |
| 6,113,240 A | * | 9/2000 | Iizuka | 353/31 |
| 6,118,113 A | | 9/2000 | Hibbard | 250/205 |
| 6,155,687 A | * | 12/2000 | Peterson | 353/84 |
| 6,416,182 B1 | * | 7/2002 | Kakuda et al. | 353/20 |
| 6,473,244 B1 | | 10/2002 | Sugano | 359/794 |
| 2002/0044264 A1 | * | 4/2002 | Lu | 353/101 |
| 2004/0027313 A1 | | 2/2004 | Pate | 345/30 |
| 2004/0028293 A1 | | 2/2004 | Allen | 382/300 |

OTHER PUBLICATIONS

Why HP digital projectors?, http://www.hp.com/sbso/product/projector/whydigitalprojector.html, Mar. 26, 2004, pp. 1-4.
Projection Display Technology, http://www.extremetech.com/article2/0,1558,1157682,00.asp, Mar. 26, 2004, pp. 1-2.
Slide projector, http://www.photonics.com/dictionary/lookup/XQ/ASP/url.lookup/entrynum.4836/letter.s/p, Mar. 31, 2004, pp. 1-2.
Digital projector, http://whatis.techtarget.com/definition/0,,sid9_gci839140,00.html, Mar. 26, 2004, pp. 1-2.
Overhead projector, http://www.photonics.com/dictionary/lookup/XQ/ASP/url.lookup/entrynum.3758/letter.o/p, Mar. 26, 2004, p. 1.
How Digital Cinema Works, http://entertainment.howstuffworks.com/digital-cinema5.htm, Mar. 26, 2004, pp. 1-2.
Projection Display Technology, The Image Engine, http://www.extremetech.com/article2/0,1558,1157683,00.asp, Mar. 26, 2004, pp. 1-4.
Projection Display Technology, Light Source, http://www.extremetech.com/article2/0,1558,1157681,00.asp, Mar. 26, 2004, pp. 1-5.

(Continued)

Primary Examiner—William C. Dowling

(57) ABSTRACT

A focusing arrangement has a lens disposed adjacent a lamp, a sensor for detecting a parameter which varies with a focal position of light focused by the lens, and a controller for adjusting the position of the lens based upon an output from the sensor in a manner which modifies the focal position of the light by the lens and maximizes the parameter detected by the sensor.

20 Claims, 3 Drawing Sheets

OTHER PUBLICATIONS

Projection Display Technology, Sidebar: A New Field-Sequential Color Approach, http://www.extremetech.com/article2/0,1558,1157687,00.asp, Mar. 26, 2004, pp. 1-2.

Projection Display Technology, Reflective Panels, http://www.extremetech.com/article2/0,1558,1157684,00.asp, Mar. 26, 2004, pp. 1-4.

Projection Display Technology, http://www.extremetech.com/article2/0,1558,10084,00.asp, Mar. 26, 2004, pp. 1-2.

The Photonics Directory (aspheric) (focal point), http://www.machinedesign.com/ASP/strArticleID/56123/strSite/MDSite/viewSelectedArti . . . , Mar. 30, 2004, pp. 1-2.

Where do voice-coil actuators fit in?, http://www.machinedesign.com/ASP/strArticleID/56123/strSite/MDSite/viewSelectedArti . . . , Mar. 30, 2004, pp. 1-4.

The Photonics Directory (servomotor) (servomechanism), http://www.photonics.com/dictionary/lookup/XQ/ASP/url.lookup/entrynum.4762/letter.s/pu . . . , Apr. 8, 21004, pp. 1-13.

"Voice Coil Actuators—An Applications Guide", BEI Kimco Magnetics Division, BEI Technologies, Inc. pp. 1-12.

* cited by examiner

FOCUSING ARRANGEMENT

BACKGROUND

When a projector such as that used in front or rear projection displays and the like, ages, the efficiency of light from the lamp that is coupled into the optical system drifts. One of the causes of this loss of efficiency can result from a misalignment occurring in the lamp focus at the entry of a light tunnel or the like type of light integrating device. This misalignment can be as a result of ageing of the entire projection system or just the ageing of the lamp burner. Ageing of the lamp burner might result in movement of the source of the arc inside the burner to shift its position. Any movement of the source of the arc inside the burner will result in a shift of the lamp focus at the coupling to the integrating device. This misalignment affects the functionality and the efficiency of the projector. It is therefore desirable to be able to align the lamp focus and maintain the projector efficiency with the passing of time.

DETAILED DESCRIPTION

Figure 1:
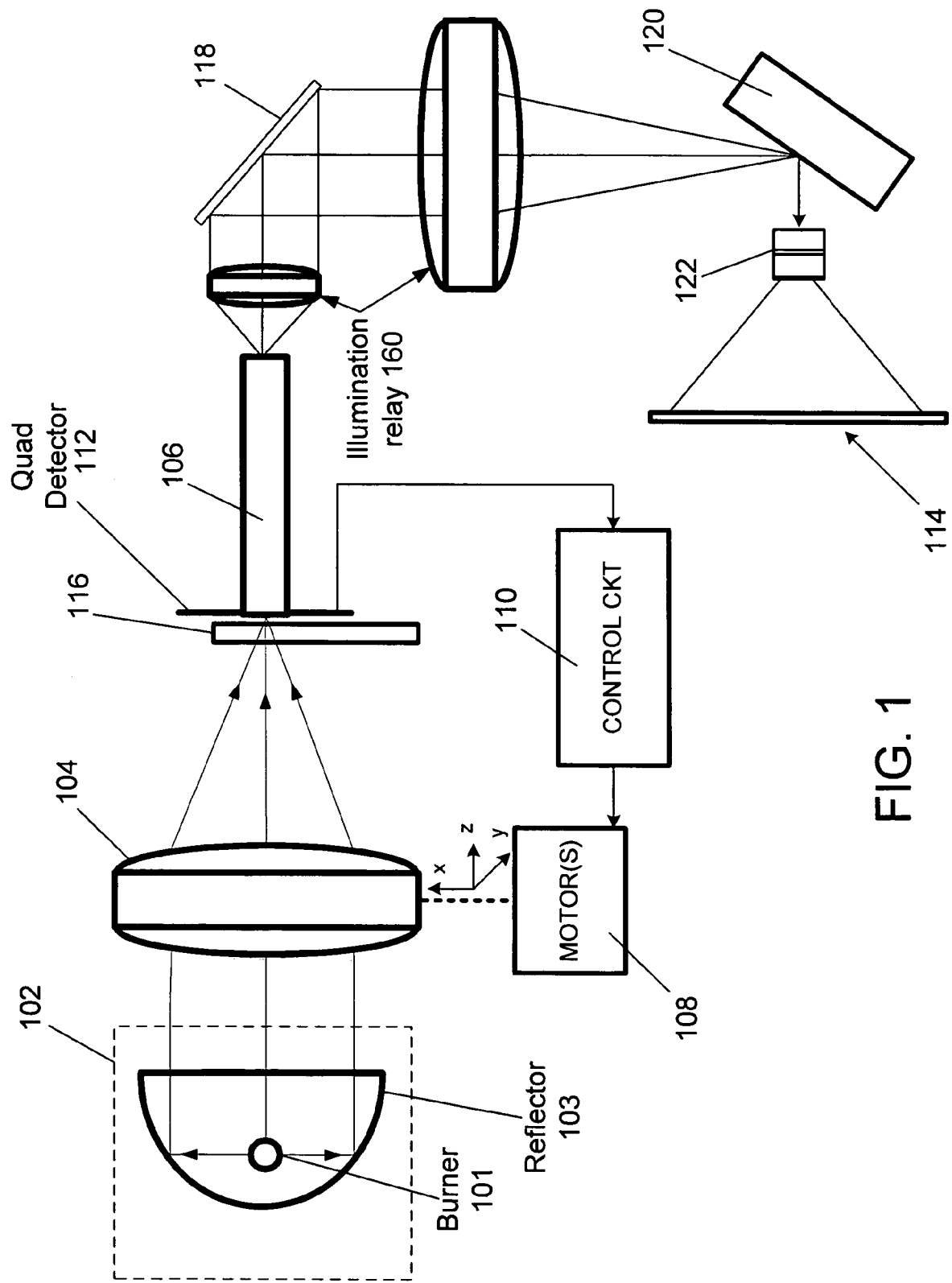
FIG. 1 is a schematic depiction of an embodiment of the present invention.

FIG. 1 shows in schematic form an embodiment of the invention. In this arrangement, a parabolic mirror and lamp arrangement 102 along with an aspheric condenser lens 104, is arranged to focus light through a color wheel 116 onto the entrance of an integrating device 106. The integrating device homogenizes the light into a planar source of light at its exit. An illumination relay 160 images the light exiting from the integrating device 106 onto the optical modulator 120. The optical modular 120 creates the images to be displayed. A projection lens 122 then images the optical modulator on the screen 114.

It should be appreciated that the arrangement depicted in FIG. 1 shows an environment in which the embodiments of the invention can be deployed, and that the disclosed embodiments of the invention are in no way limited to this particular type of arrangement. For instance, instead of a parabolic reflector an elliptical reflector can be used. Instead of using a color wheel, a 2-3 panel optical modulator can be used where each panel handles one or more colors.

The lamp arrangement 102 consists of a burner 101 and a reflector 103. The light source is located inside the burner 101. The reflector 103 can have a spherical shape, a conical shape (elliptical or parabola), a generic aspheric shape or can be a faceted one. The position of the light source inside the burner in relation to the focus of reflector affects the ability of the reflector 103 to collimate or focus the light outside the reflector 103. This position of the light source in relation to the reflector 103 focus may vary slowly with time and as a result the light being reflected from the reflector 103 will shift from its intended target.

The condenser lens 104 is responsible for focusing the light from the lamp 102 into the entrance of the integrating device 106 such that it maximizes the light coupled into the integrating device 106. The condenser lens 104 may be a single lens or a combination of lenses. The condenser lens 104 or its constituents can be spherical or aspherical.

The condensing lens 104 which can be an aspheric type condensing lens, is, in this embodiment, operatively connected with a motor(s) arrangement 108, which is configured to move the lens 104 along or about three mutually perpendicular axes x, y and z. As will be appreciated, this movement can be linearly along the axes and/or rotational movement about at least the x and y axes. The goal of the condenser lens 104 movement is to position the focus of the condenser lens 104 in the relation to the center of the integrating device 106 in such a manner that maximizes the light going in the device. The plane x-y refers to the plane of the lens and z axis is the optical axis of the system or the centerline connecting the parabolic reflector and the integrating device 106. The movement of lens 104 in the z direction adjusts the focus of the lens in this direction. The movement of lens in x-y direction or rotation about these axes results in the lateral (x-y plane) movement of the focused spot.

Figure 2:
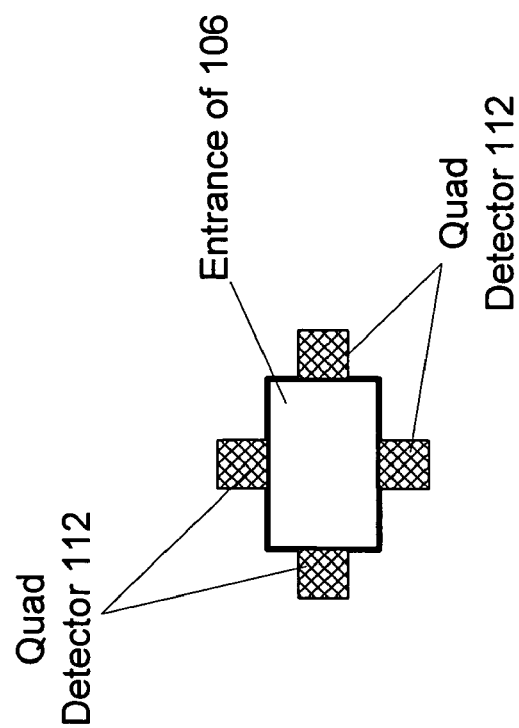
FIG. 2 is a schematic front view of a sensor arrangement which is used in the arrangement depicted in FIG. 1.

The motor(s) arrangement 108 is controlled by signals inputted from a control circuit 110. This control circuit 110, as schematically shown, is, in this embodiment, connected with a light sensor 112 which is arranged to respond to a parameter which corresponds to the brightness or lumens which are generated at a screen 114. The light sensor can, be a quad detector such as depicted in FIG. 2, which comprises a group of 4 detectors around the periphery of the integrating device 106. The lateral or longitudinal displacement of the focused spot from the center of integrating device 106 can be detected by the unbalance or reduction of signals produced by the quad detector 112.

However, the light sensor 112 is not limited to the illustrated location or above-mentioned type, and can be located at any other location in the system where it can detect light as a function of lamp alignment with the integrating device 106.

Figure 3:
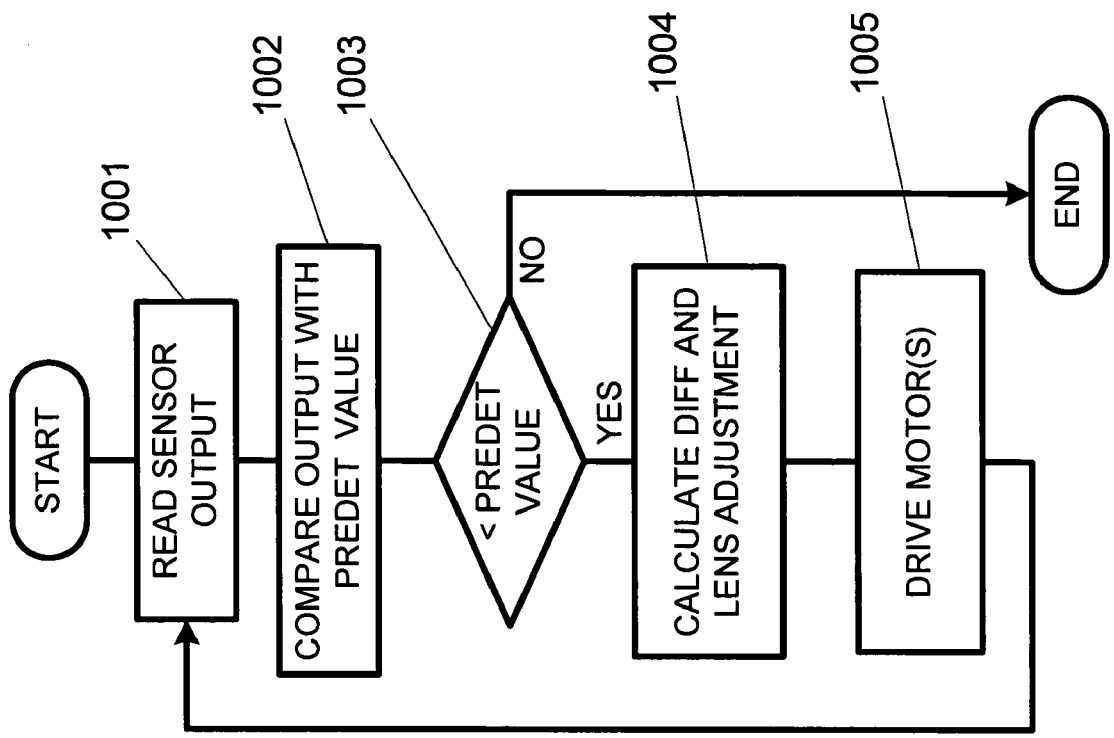
FIG. 3 is a flow diagram which depicts the steps which are carried out in accordance with an embodiment of the invention in order to compensate for drift and loss of focus alignment.

The control circuit 110 can be configured to include a microprocessor (note shown) which runs an algorithm via which the operation of the motor(s) 108 can be controlled. An example of this algorithm is depicted in flow chart form in FIG. 3.

As shown, the first step 1001 is to read in data from the set of quad detectors (sensor 112) placed at the entrance to the integrating device 106. As will be appreciated, these detectors can be use to detect the displacement of the focused spot in the plane of the entrance to the integrating device 106. More specifically, any imbalance in the signals generated by the quad detectors will indicate the direction of movement of focus in the plane of the entrance of the integrating device that is required to achieve an optimal focus. Following this, a parameter or parameters indicative of optimal focusing by the condensing lens 104 is evaluated and compared with a previously determined value(s) (step 1002).

This predetermined value can represent the maximum value that can be expected to be produced for the age of the bulb and the like associated with the generation of the light which is focused by the condensing lens 104. A look-up table and a clock sub-routine can be used to keep track of the age of the arrangement and to update the value with the passing of time. This, or another routine, can be made sensitive to bulb replacement if so desired.

In the event that sensed value is not less then the predetermined value (step 1003), the routine ends in that no detrimental drift in lens focus is indicated.

However, in the event that most recent value of the parameter being examined is lower than the predetermined value (step 1003), the routine flows to step 1004 wherein the appropriate lens adjustment is calculated and/or predicted and the motor(s) arrangement 108 energized to incrementally change the position of the lens 104 with respect to the integrating device 106.

The manner in which the motor(s) arrangement 108 is energized can be controlled in a number of ways which will be self-evident to those skilled in the feedback control art. Simply by way of example, an initial arbitrary adjustment can be selected. However, when implemented, if the sensor 112 is such as to provide an input indicative of the above mentioned parameter value reducing even further, the adjustment can be reversed and incremented in an opposite direction. This procedure can be repeated and/or conducted for each of the directions in which the condensing lens is arranged to be moved. If the maximum expected value is not determined to have been reached in step 1003 the process can cycle through a series of positional adjustments until the desired system efficiency is restored and screen lumens are maximized.

Figure 4:
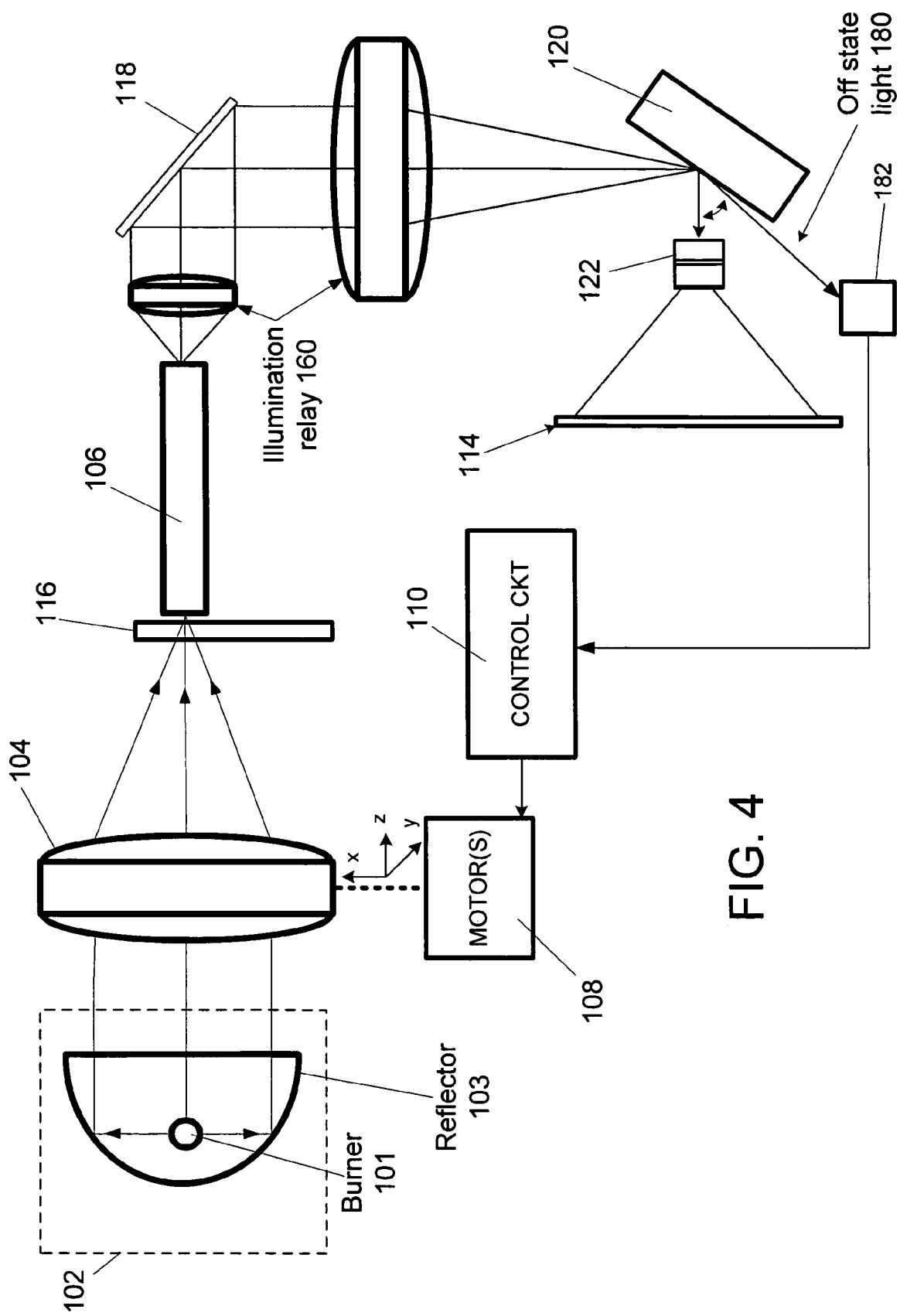
FIG. 4 is a schematic depiction of a further embodiment of the present invention.

In a further embodiment, shown in FIG. 4, in the case of DMD™ (Digital Micromirror Device™) or MMD™ (Micro Mirror Device™) based projectors, a single detector 182 can be used to detect the light deflected in the off-state 180 of the DMD type optical modulator. The position of the condenser lens 104 can be adjusted using this detection to maximize the signal at the detector. An algorithm of the nature shown in FIG. 3 can be, merely by way of example, be used to implement the corrective motor energization. Placing the detector in the off state light region 180 of the DMD avoids the need for the detector to be placed in the projection path to the screen.

As will be appreciated, the invention has been disclosed with reference to only a limited number of embodiments, however, the various changes and modifications which can be made without departing from the scope of the invention which is limited only by the appended claims, will, given the preceding disclosure, be self-evident to those skilled in the art of or circuit design or that which closely pertains thereto.

For example, even though the arrangement shown in FIG. 1 has been disclosed as including a DMD, it should be understood that this arrangement has been used merely by way of example and that other optical modulators such as Lcos, LCD or those based on inferometery may be used in place thereof. Further, the integrating device can take the form of an integrating tunnel, rod or fly's eye condenser lens, for example. For the purpose of illustration only, a rectangular apertured integrating tunnel has been illustrated in FIG. 2.

What is claimed is:

1. A method of focusing light in a device having a light source and a lens associated with the light source for focusing the light from the light source onto a light transmitting element, comprising:
sensing a parameter which varies with the light focused onto the light transmitting element, wherein the step of sensing comprises arranging a plurality of sensing elements in a predetermined spatial arrangement with respect to one another and an entrance of the light transmitting element;
determining relative spatial adjustment of the one of the light source and the lens with respect to the other necessary to maximize the sensed parameter; and
implementing the relative spatial adjustment.

2. The method as set forth in claim 1, wherein the step of determining relative spatial adjustment comprises:
comparing the sensed parameter with a predetermined value and determining, in the event that the sensed parameter is less than a predetermined value, the relative spatial adjustment between the lens and the light transmitting element which will increase the sensed parameter toward the predetermined value.

3. The method as set forth in claim 1, wherein the step of sensing a parameter comprises sensing lumens generatable by a light beam which has at least reached the light transmitting element.

4. The method as set forth in claim 1, wherein the step of implementing the relative spatial adjustment comprises moving the lens with respect to the light transmitting element along at least one of a plurality of mutually perpendicular axes.

5. The method as set forth in claim 1, wherein the step of implementing the relative spatial adjustment comprises rotating the lens about at least one of a plurality of mutually perpendicular axes.

6. The method as set forth in claim 1, further comprising:
directing the light from the light transmitting element onto an optical modulator.

7. The method as set forth in claim 6, wherein the optical modulator comprises at least one pivotal mirror; and which further comprises: detecting the lumens in a beam of light which is directed away from a projection path by the at least one pivotal mirror.

8. A focusing arrangement comprising:
a light transmitting element;
a source of light;
a condensing lens disposed between the source of light and the light transmitting element so as to focus the light on the light transmitting element;
a sensor responsive to a parameter which varies with the focus of light on the light transmitting element; and
a drive arrangement operatively connected with the condensing lens to adjust the position of the lens relative to the light transmitting element in response to an output of the sensor;
wherein the sensor is disposed at an entrance of the light transmitting element, and wherein the sensor comprises a plurality of detectors arranged in a predetermined spatial arrangement with respect to one another and the entrance of the light transmitting element.

9. A focusing arrangement as set forth in claim 8, further comprising an optical modulator which receives and reflects the beam of light from the light transmitting element.

10. A focusing arrangement as set forth in claim 9, wherein the optical modulator comprises at least one pivotal mirror and wherein the sensor is disposed to receive a beam of light which is directed by the at least one pivotal mirror away from a projection path.

11. A focusing arrangement, comprising:
a lens disposed adjacent a lamp;
a sensor for detecting a parameter which varies with a focal position of light focused by the lens;
a controller for adjusting a position of the lens based upon an output from the sensor in a manner which modifies the focal position of the light by the lens and maximizes the parameter detected by the sensor; and
a light transmitting element onto which the light focused by the lens, is focused, and which is operatively interposed between the lens and a screen which lies at an end of a projection patch along which light emitted by the light transmitting element, is directed;
wherein the light transmitting element comprises a light integrating device;
wherein the sensor is disposed at an entrance of the light integrating device;

wherein the sensor comprises a plurality detectors which are arranged in a predetermined spatial arrangement with respect to each other and the entrance of the light integrating device.

12. The focusing arrangement as set forth in claim 11, wherein the lens comprises a condensing lens.

13. The focusing arrangement as set forth in claim 11, wherein the lens comprises an aspherical lens.

14. The focusing arrangement as set forth in claim 11, further comprising a screen onto which light, which has passed through the lens, is projected and wherein the parameter detected by the sensor comprises lumens generated by light traveling along a projection path toward the screen.

15. The focusing arrangement as set forth in claim 11, further comprising an image generating device disposed in a projection path of light transmitted through the light transmitting element and arranged to direct light toward the screen to form an image.

16. The focusing arrangement as set forth in claim 15, wherein the image generating device comprises a plurality of mirrors which are selectively pivotal to project light to a projection lens or away from the lens and wherein the sensor is disposed to receive the light directed away from the projection lens.

17. A focusing arrangement having a light source and a lens associated with the light source for focusing light from the light source onto a light transmitting element, comprising:

means for sensing a parameter which varies with the focus of the light on the light transmitting element by the lens;

means for comparing the sensed parameter with a predetermined value and calculating, in the event that the sensed parameter is less than the predetermined value, the relative spatial adjustment between the lens and the light transmitting element which will increase the sensed parameter toward the predetermined value; and means for implementing the calculated relative spatial adjustment;

wherein the parameter sensing means comprises a sensor which comprises a plurality of detectors which are arranged in a predetermined spatial arrangement with respect to each other and the light transmitting element.

18. The focusing arrangement as set forth in claim 17, wherein the sensor is configured to sense lumens in a beam of light traveling from the lens along a projection path which leads to an optical modulator.

19. The focusing arrangement as set forth in claim 17, wherein the implementing means comprises a motor arrangement for moving the lens with respect to the light transmitting element along at least one of a plurality of mutually perpendicular axes.

20. The focusing arrangement as set forth in claim 17, wherein the implementing means comprises a motor arrangement for rotating the lens about at least one of a plurality of mutually perpendicular axes.

\* \* \* \* \*